Feb. 11, 1964
A. J. PIPPERT ETAL
PACKING RING WITH LOAD BEARING BODY
AND PROCESS FOR MAKING SAME
3,120,960
Filed Dec. 15, 1960
2 Sheets-Sheet 1
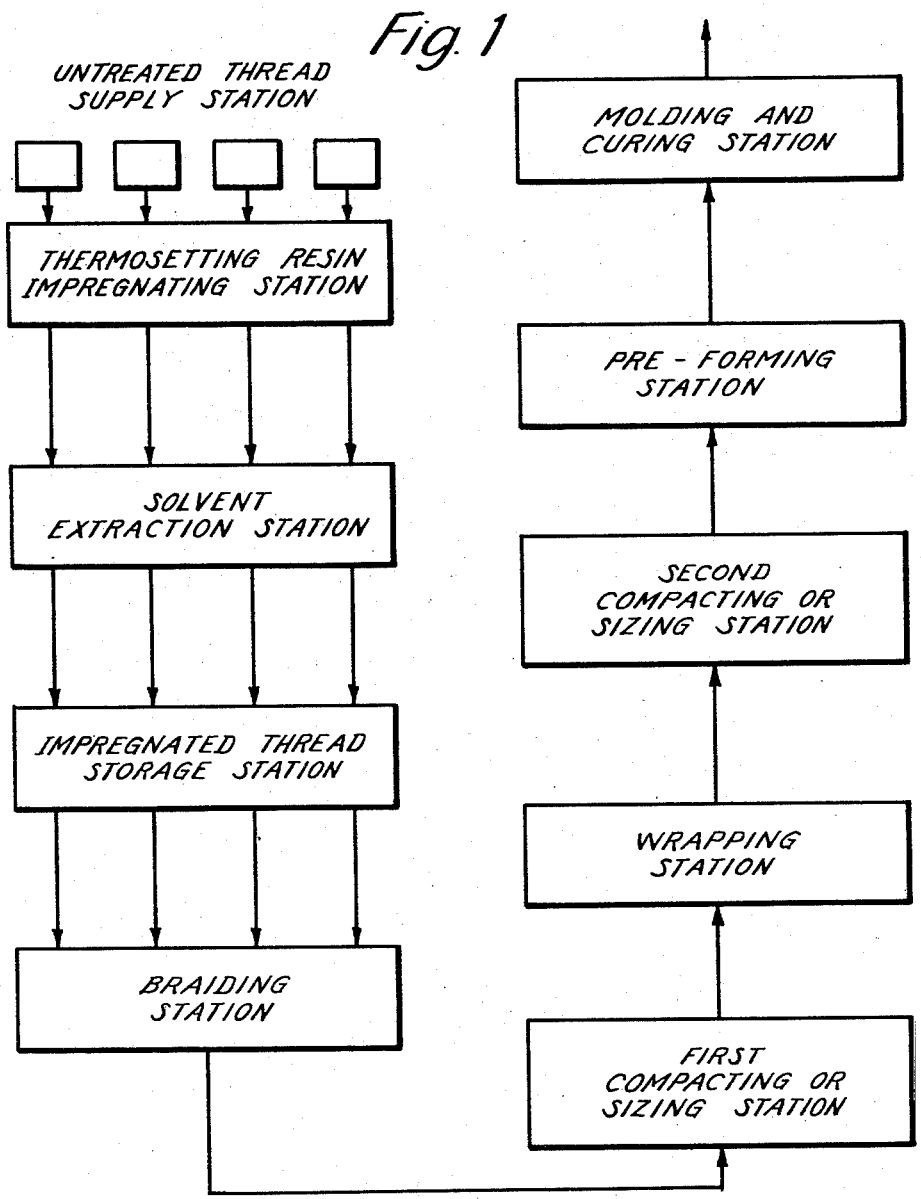
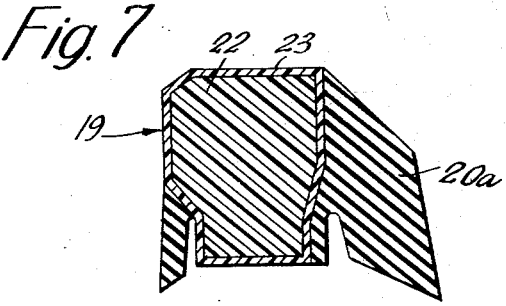
Aaron J. Pippert
E. B. Heathcott
INVENTORS
BY Browning, Simms
Hyer & Eickenroht
ATTORNEYS

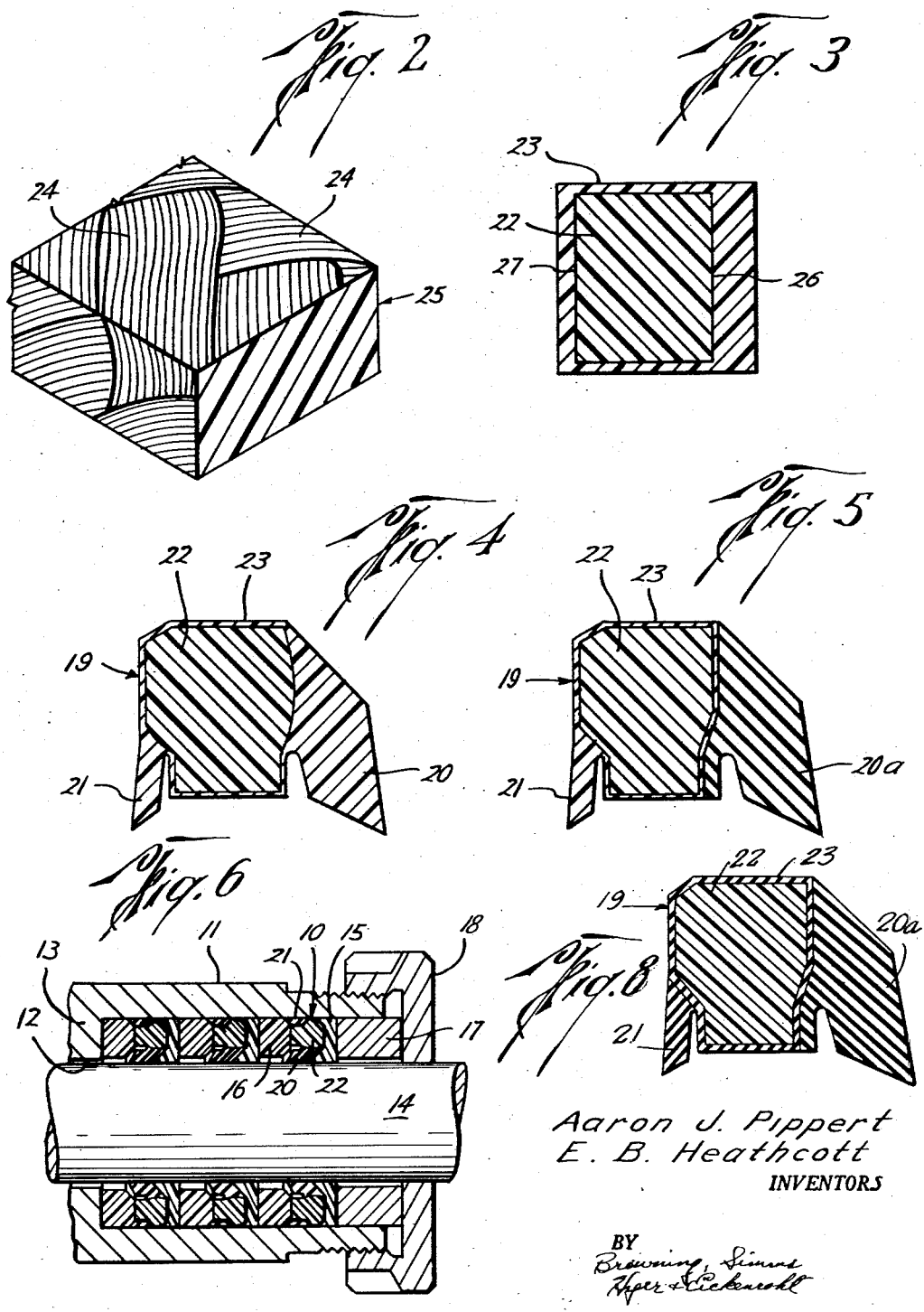

United States Patent Office 3,120,960
Patented Feb. 11, 1964

3,120,960
PACKING RING WITH LOAD BEARING BODY
AND PROCESS FOR MAKING SAME
Aaron J. Pippert, and E. B. Heathcott, Houston, Tex., assignors to Universal Packing & Gasket Company, Houston, Tex.
Filed Dec. 15, 1960, Ser. No. 76,002
8 Claims. (Cl. 277—230)

This invention relates to packing devices and to a process for making same. More particularly, in one of its novel aspects the invention relates to an improved packing for preventing leakage about a tube or shaft passing through an opening in a wall, for example, a packing ring for preventing leakage about the fluid rod of a pump or the like. In another of its novel aspects, the invention relates to a process for manufacturing a packing ring of the type having a rigid, substantially incompressible load bearing body of thermosetting material and pressure actuated sealing means made integral therewith.

It is common practice to employ one or more packing rings in a stuffing box which surrounds both an opening in a wall and a tube or shaft passing through such opening for preventing leakage between the wall and the tube or shaft, the packing rings being held in operative position by a retainer or gland ring. The packing rings generally have a relatively hard load bearing body portion for supporting the rings and transmitting the axial forces between the several rings due to pressures of the fluids being contained and/or the endwise pressure exerted thereon by the stuffing box gland ring, and relatively soft sealing means carried by the load bearing body for sealing between the outer periphery of the tube or shaft and the inner periphery of the stuffing box.

It is considered necessary that the load bearing body portion of the packing rings be capable of maintaining their respective shapes at all time so that they will not be deformed or crushed either by the forces exerted by the fluids being confined, even though these fluids may be at high pressures and/or high temperatures, or by the forces exerted on the packing ring bodies when the gland ring is tightened down during installation and/or use. This ability to withstand axial forces without deformation and/or crushing provides many important advantages including, for example, eliminating the danger of collapse and possible failure of the packing rings under normal conditions of installation and/or use, substantially increasing the service life of the rings and eliminating the necessity of adjusting or tightening the gland ring in the stuffing box after initial installation of the packing rings therein.

Many designs have been proposed in an attempt to produce a packing ring capable for providing these important and desirable results. However, none of these presently known packings are considered satisfactory for use in many important applications. For example, some packing rings have been provided having metal load bearing bodies and separate pressure actuated seals mounted in grooves or the like formed in the metal bodies. These metallic rings are considered objectionable because of their high cost and also because the body portion and sealing portion of the packing cannot conveniently be made integral as is preferred. Other packing rings have been developed having load bearing bodies of relatively hard rubber or the like with flexible lip-type seals molded therewith. These molded packing rings are considered objectionable because they cannot withstand the axial forces to which they are subjected in many applications without being crushed or deformed, particularly when the fluid being confined is at a high pressure and/or a high temperature, or when the gland ring is accidently over-tightened.

An object of this invention is to provide a packing which obviates the foregoing difficulties and disadvantages.

Another object of the invention is to provide an improved packing ring of molded construction which is capable of maintaining its shape under all normal conditions of use and/or installation.

Another object of the invention is to provide an improved packing ring having an uncrushable load bearing body and pressure actuated seals made integral therewith.

Another object of the invention is to provide a packing ring having a rigid substantially incompressible load bearing body of thermosetting material with flexible sealing lips molded along its radially inner and radially outer surfaces.

Another object of the invention is to provide an improved plunger packing of molded construction which cannot be deformed or crushed under normal conditions of use and/or installation even though it may be exposed to relatively high axial forces and/or high temperatures during such installation and/or use.

Another object of the invention is to provide an improved packing ring having an uncrushable body and pressure actuated seal means molded along at least one of its radially inner and radially outer surfaces that is economical to manufacture and provides a relatively long service life as compared to packing rings presently known and used.

Another object of the invention is to provide a plunger packing of molded construction of the type having pressure actuated sealing means which cannot be deformed or crushed under normal conditions of operation and/or installation and which does not require adjustment in use even though it may be exposed to high fluid pressures and/or high fluid temperatures.

Another object of the invention is to provide a packing ring of molded construction having a load bearing body of a rigid, substantially incompressible thermosetting material with flexible sealing lips molded along its inner and outer surfaces and having means for confining the thermosetting body material against flow or extrusion into the sealing lips during manufacture of the ring.

Another object of the invention is to provide a process for manufacturing a packing ring having a rigid, substantially incompressible load bearing body of thermosetting material and pressure actuated sealing means of different material made integral therewith.

Another object of the invention is to provide a process for manufacturing a packing ring of the type having an uncrushable load bearing body of thermosetting material and flexible sealing lips molded along its radially inner and radially outer surfaces in which the thermosetting material is confined against extrusion into the flexible sealing lips during manufacture of the ring.

Another object of the invention is to provide a process for manufacturing a packing ring of the type having a rigid, substantially incompressible load bearing body of thermosetting material and flexible sealing lips molded along its radially inner and radially outer surfaces in which the load bearing body is sufficiently flexible prior to molding operations so that it can be easily shaped into a desired configuration for molding with the sealing lips, yet is sufficiently firm and compact so that it can be confined against extrusion into the sealing lips during molding operations.

Other objects, advantages and features are inherent and will become apparent upon consideration of the specification, claims and attached drawings.

In the drawings which represent one form of the process and various forms of the packing ring of this invention with which the foregoing objects and advantages can be accomplished and wherein like characters are used to designate like parts throughout the several views:

FIG. 1 is a schematic flow diagram illustrating the process feature of this invention and which can be used to advantage in manufacturing one form of the packing ring thereof;

FIG. 2 is an isometric view of a portion of a braided core stock suitable for use in making the packing ring of this invention and which may be produced as an intermediate product at the first compacting or sizing station stage of the process illustrated in FIG. 1;

FIG. 3 is a view in cross section of a packing ring taken during an intermediate stage of its manufacture and represents one form that the ring may take after it has been passed through the second compacting or sizing station stage of the process of FIG. 1;

FIG. 4 is a cross sectional view of one embodiment of a packing ring constructed according to this invention having an incompressible load bearing body of thermosetting material and inner and outer flexible sealing lips made integral therewith;

FIG. 5 is a cross sectional view of another embodiment of the packing ring of this invention constructed similarly as the ring of FIG. 4 except that the inner and outer flexible sealing lips are constructed of different materials rather than of the same material as in the ring of FIG. 4; and FIG. 6 is a cross sectional view through a stuffing box having packing rings constructed in accordance with this invention mounted in operative position therein.

FIG. 7 is a view similar to FIGS. 4 and 5 but showing another embodiment of the packing ring of this invention in which the body has a sheath surrounding it and lips outside the sheath which are of a material different from that of the sheath but the same in both lips.

FIG. 8 is a view similar to FIG. 7 of a still further embodiment in which the lips are materials different from that of the sheath and also different from each other.

Referring now to the drawings, it will be seen that one or more packing rings (there are three in the example shown) indicated generally at 10 and constructed according to this invention may be mounted in operative position within a stuffing box 11 which surrounds an opening 12 in a wall 13 and a tube or shaft 14 which extends through such opening, the packing rings being shaped and proportioned so that their outer extremities bear against the internal periphery of the stuffing box 11 and so that their inner extremities bear against the periphery of the tube or shaft 14. Each of rings 10 may be provided with an upper and a lower backup or adapter ring 15—16, respectively, the packing ring and its corresponding adapter rings constituting a unit and the several units being held in operative position by a gland ring 17 which is removably mounted within and movable axially through the stuffing box 11 by suitable means such as the threaded cap 18.

Referring now in more detail to the packing ring of this invention, each of the rings 10 is of molded construction and includes a load bearing body portion 19 having substantially flat parallel upper and lower support surfaces with pressure actuated sealing means, such as flexible sealing lips 20 and 21, made integral therewith about its radially inner and radially outer sealing surfaces, respectively. Body portion 19 comprises an inner core 22 of a thermosetting material which is of a flexible nature prior to being molded and cured during manufacture of the ring, a flowable nature during molding and curing operations, and a rigid, substantially incompressible nature after being molded and cured, and an outer sheath 23 of a different material tightly enclosing the outer surfaces of core 22 for preventing extrusion or flow of the thermosetting material contained therein into the flexible sealing lips 20 and 21 during the molding and curing operations. Adapter rings 15 and 16 also are constructed of a thermosetting material which may be similar in nature to that used in the construction of core 22.

It will be understood that a wide variety of thermosetting materials can be used in the construction of core 22 and/or adapter rings 15 and 16, the primary requirements being that the particular thermosetting material selected should be capable of being converted from an uncured condition to a cured condition during molding operations and should be capable of withstanding the axial forces to which it may be subjected under the expected conditions of installation and/or use, without being deformed or crushed. By way of illustration, we have found that phenolic resins, for example phenol-formaldehyde type resins, can be used to advantage in many applications since they can be easily cured by molding at relatively low pressures and temperatures yet are capable of withstanding extremely high fluid and/or gland pressures after being cured. The thermosetting material which will provide the best results under any given set of operating and/or manufacturing conditions can be readily determined by routine tests.

It also will be understood that confining sheath 23 may be constructed of a wide variety of materials, the primary requirement being that this material should be capable of acting as a barrier between core 22 and flexible sealing lips 20 and 21 to prevent flow or extrusion of the thermosetting material from the core into the flexible sealing lips during manufacturing operations. However, in the event the characteristics of one or both flexible lips required are such as may be provided by a suitable sheath material it is desirable to form one or both of flexible sealing lips 20 and 21 of the same material used in the construction of sheath 23 (as is the case in the embodiments illustrated in the drawings). The sheath material should be selected so that it is capable of performing both the confining function of the sheath and the sealing function of the flexible lips and should be supplied in an amount at the desired point on the ring surface over and above the amount required to enclose core 22 sufficient upon being molded to provide laterally extending sealing lips of desired size and shape. We have found that woven, natural or synthetic materials, such as cotton, nylon, or the like, impregnated with natural rubber, synthetic rubber, or other resilient sealing materials can be used to advantage for at least some seal jobs both as a confining sheath and as one or both of the inner and outer flexible sealing lips. It will be understood that in some cases the seal usage will make it desirable that only one of the two lips have characteristics which a material suitable for the sheath can provide and that the other lip have characteristics which the sheath material cannot provide. In such cases only one lip will be formed of the sheath material and the other lip of some other material which will provide a lip of the desired characteristic. (FIG. 5.) In cases where one suitable material will provide the characteristics desired for both lips, both my be formed of the same sheath material. (FIG. 4.) In either case the sealing lips can be formed in any desired size and shape. In the event that the sheath material will not provide the characteristics desired for either lip but the desired characteristics for both lips are the same, both of the sealing lips may be constructed of the same material, such material being different from the material of the confining sheath. If the sheath material selected will not provide the characteristics desired for either lip and the characteristics desired for the two lips are different from each other, both of the sealing lips may be constructed of sealing materials different from each other and also different from the material of the confining sheath. The material of construction for the confining sheath and/or the sealing lips, as well as the size of the sealing lips, which will provide the best results under the expected conditions of operation can be determined by routine tests.

According to another novel feature of the invention, inner core 22 may be provided by a laminated structure comprising a braided material impregnated with the thermosetting material, the several threads making up the braid preferably being individually impregnated with the thermosetting material prior to being braided together. This braided construction provides sufficient flexibility in the core prior to molding and curing operations to permit it to be shaped or preformed into a desired configuration for molding and curing with the inner and outer sealing lips. The individual threads making up the braid of core 22 should be sufficiently small and tightly spun so that each thread may be thoroughly saturated with the thermosetting material prior to being braided, and the thermosetting material should be supplied in an amount over and above the amount required to saturate each thread sufficient to bond the several threads together to produce a laminated structure without being extruded in the mold during the molding and curing operations. It will be understood that the proportion of thread material to thermosetting material contained in the braided core may vary depending, among other things, upon the particular thread material and thermosetting material being used. By way of illustration, we have found that a braided core comprising equal parts by weight of relatively small, tightly spun cotton threads and a phenol-formaldehyde resin provides excellent results over a wide range of operating conditions.

From the foregoing description, it can be seen that although the packing ring of this invention is of molded construction and therefore provides the advantages of a molded packing over a metallic packing, it is not subject to the disadvantages and undesirable features of presently known molded packings. For example, the load bearing body portion of the ring is constructed of a rigid substantially incompressible thermosetting material and therefore cannot be deformed or crushed under normal conditions of operation, even though it may be exposed to extremely high fluid pressures and/or high fluid temperatures. Further, there is no danger of crushing or collapsing the packing rings during installation and/or use due to accidental overtightening of the gland ring as is the case in presently known molded packings. Still further, it is not necessary to adjust or tighten the gland ring after initial installation of the packing, even though the fluids being contained may be at relatively high pressures and/or high temperatures. In addition, means has been provided for preventing flow or extrusion of the thermosetting material contained in the load bearing body into the flexible sealing lips adjacent thereto during manufacture of the ring.

Turning now to the process feature of this invention which can be used to advantage in manufacturing the packing rings thereof, it will be seen that such process includes the steps of: preparing a core stock containing a thermosetting material, said core stock being of a flexible nature prior to molding and curing operations but of a rigid, substantially incompressible nature after being molded and cured; encasing said core stock in a confining sheath of a different material; shaping said encased core stock into a load bearing body of desired configuration for molding with sealing means positioned along at least one of the radially inner and radially outer surfaces of the load bearing body; and molding said load bearing body and said sealing means together to provide an integral, substantially uncrushable packing ring of predetermined size and shape.

More particularly and with reference to the embodiment of the process illustrated in FIG. 1, it will be seen that a core stock for forming the load bearing body portion of the packing ring may be prepared by first individually impregnating a plurality of threads with an uncured thermosetting resin and then braiding the several resin impregnated threads together so as to provide a firm, compact core stock of desired size and shape. As shown, the several threads may be individually impregnated with the uncured thermosetting resin by passing the threads, either singly or in groups, through a bath containing a solution of the resin in such a manner that each thread is thoroughly saturated with the resin solution, the resin saturated threads then being passed through a solvent extraction station to remove the solvent contained therein and dry the threads prior to storing them for use in subsequent braiding operations. Since the several threads making up the braided core stock are individually impregnated with the uncured thermosetting resin and dried prior to being braided together, the resulting core stock is sufficiently flexible to permit it to be shaped or preformed into an annular body of desired configuration for molding and curing.

As will be understood, the braid threads may be made from a wide variety of materials, including natural and synthetic fibers, the primary requirements being that each thread should be sufficiently small in diameter and its filaments or fibers should be sufficiently tightly spun so that the thread will be thoroughly saturated with the thermosetting resin during its travel through the impregnating bath. When two or more threads are passed through the impregnating bath in groups, the several threads in each group should not be braided or otherwise twisted together but rather should be spaced apart so that the entire outer surface of each thread will be exposed to the resin solution to insure complete saturation of each thread in each group.

It also will be understood that a wide variety of thermosetting resins can be used for impregnating the threads making up the braided core, the primary requirements being that the particular thermosetting resin selected should be capable of being converted from an uncured condition to a cured condition during molding and curing operations and should be capable after being cured of withstanding the axial forces to which it may be subjected under the expected conditions of installation and/or use, without being deformed or crushed. In this connection, it may be desirable to incorporate various additives in the thermosetting resin such as catalysts or curing agents, fillers, plasticizers, and the like, and the term "thermosetting resin" is intended to mean and include a thermosetting resin with or without such additives incorporated therein.

The proportion of thread material to thermosetting resin contained in the braided core stock may vary depending, among other things, upon the particular thread material and thermosetting resin being used. In any event, it is preferable to supply the thermosetting resin in an amount over and above the amount required to saturated each thread contained in the braid sufficient to bond the several threads together to produce a laminated structure without being extruded during the molding and curing operations. By way of illustration, we have found that a braided core stock containing equal parts by weight of relatively small, tightly spun cotton threads and a phenol-formaldehyde resin catalyzed with hexamethylenetetramine is easily convertible upon molding into a rigid, substantially incompressible laminated structure, yet can be controlled so as not to extrude into undesirable parts of the mold during molding and curing operations. The proportions of thread material and thermosetting material required in each application can be readily determined by routine tests.

The number of resin impregnated threads and the braiding technique for braiding these threads together should be selected so that the size and shape of the core stock produced at the braiding station corresponds as closely as possible to the desired size and shape of the load bearing body portion of the finished packing ring and so that this load bearing body will have a maximum compressive strength. By way of illustration, we have found that arranging the several resin impregnated threads in groups, indicated at 24, and tightly braiding the several groups together in a square braid configuration provides a moldable core stock 25 (see FIG. 2) that can be used to advantage in manufacturing packing rings capable of performing in an outstanding manner under a wide range of operating and/or installation conditions.

In some cases, it may not be possible or at least not practical to produce a braided core stock at the braiding station sufficiently firm and compact so that it can be controlled without extrusion into undesirable parts of the mold during the molding and curing operations. In such cases, it may be desirable to further compact and/or size the braided core stock before passing it to the wrapping station. This first compacting or sizing operation can be carried out by any suitable means such as by passing the braided core between a pair of pressure rolls or pulleys (not shown).

The uncured thermosetting resin contained in the braided threads may be of a flowable nature under the conditions of pressure and/or temperature used in the molding and curing operations. Under these circumstances, we have found that even though the total amount of uncured thermosetting resin contained in the core stock may be controlled within relatively narrow limits, the resin nonetheless may tend to extrude or flow from the core into undesirable parts of the mold during these operations. For example, we have found that the thermosetting resin contained in the braided core may flow into the inner and/or outer flexible sealing lips of the packing ring during the molding and curing operations and subsequently become hardened or cured therein. These laterally extending protrusions of cured thermosetting resin are considered objectionable not only because they interfere with the normal operation of the ring seals, but also because they may extend outwardly from the ring body a sufficient distance to prevent the ring from being mounted in the space between the stuffing box and the tube or shaft being sealed.

According to another novel feature of the invention, this difficulty is overcome by tightly encasing the braided core stock in a confining sheath of a different material in such a manner that the confining sheath acts as a barrier between the core and seals and prevents flow or extrusion of the thermosetting resin from the core into the flexible sealing lips during the molding and curing operations. As illustrated in FIG. 1, this may be accomplished by passing the braided core stock containing the thermosetting resin from the first packing station (or from the braiding station if additional compacting is not required) through a wrapping station where it is tightly wrapped and confiningly enclosed in a relatively thin layer of a different material.

This confining sheath may be constructed of a wide variety of materials, the primary requirement being that it should be capable of preventing flow or extrusion of the thermosetting resin from the core into the flexible sealing lips during manufacturing operations. However, according to still another feature of the invention, one or both of the flexible sealing lips may be constructed of the same material as is used in the confining sheath and may comprise laterally extending parts of the sheath. In such cases, the sheath material should be selected so that it is capable of performing both the confining function of the sheath and the sealing function of the flexible lips, and should be supplied in an amount over and above the amount required to enclose the core sufficient to provide sealing lips of desired size and shape. We have found that natural or synthetic materials such as a woven fabric of cotton, nylon, or the like, impregnated with natural rubber, synthetic rubber, or other resilient sealing materials, can be used to advantage both as a confining sheath and to form one or both of the inner and outer flexible sealing lips.

In FIG. 3 there is illustrated a core 22, which may be of braided construction of the type shown in FIG. 2, and which has been tightly encased in a confining sheath 23 at the wrapping station against extrusion. An extra portion of sheath material has been supplied along the sides 26 and 27 of the core in an amount sufficient upon being molded to form inner and outer sealing lips of desired size and shape, for example, lips 20 and 21, respectively, of the ring shown in FIG. 4. As will be understood, extra sheath material for forming a sealing lip may be supplied on only one side of the core and different sealing material may be provided along the other side of the core and bonded thereto during the molding operation to produce a packing ring having one sealing lip and its confining sheath constructed of the same material and the other sealing lip constructed of a different material. A ring of this type having one sealing lip 21 and a confining sheath 23 constructed of the same material and the other sealing lip 20a constructed of a different material is illustrated in FIG. 5. On the other hand, it also will be clear that the sheath material may be supplied only in an amount sufficient to confiningly enclose the core against extrusion and both sealing lips may be constructed of material different from the confining sheath and either the same or different from each other, as the particular application may require.

After the core has been tightly encased in its confining sheath at the wrapping station, it may be desirable to additionally compress or size the encased core prior to shaping or preforming it for molding. This second compacting or sizing operation may be accomplished in any suitable manner as by passing the encased core between a pair of pressure rolls or pulleys similarly as in the case of the braided core compacting operation previously described.

After the encased core has been additionally compacted at the second compacting station, it is passed to a preforming station where it is shaped into an annular body of desired configuration for molding. In the event one or both of the sealing lips of the ring are to be constructed of a material different from the confining sheath material as described above, such different sealing material which may be any material selected from known sealing materials having the desired characteristics and suitable for bonding to the material of the sheath is positioned adjacent to and preferably is glued or otherwise bonded with the appropriate radially inner or radially outer surface of the encased core prior to passing the preformed body to the molding station. This sealing lip material may be so positioned and bonded to the encased core either before or after it has been preformed.

In the final stage of the process illustrated in FIG. 1, the preformed annular body (comprising the inner core containing the uncured thermosetting material, the outer confining sheath of different material, and the sealing material of whatever nature positioned along the radially inner and radially outer surfaces of the annular body) is placed in a suitable mold at the molding station and is subjected to sufficient pressure and temperature while confined in the mold to cure the thermosetting resin contained in the braided core and form the adjacent sealing material into flexible sealing lips of desired size and shape.

From the foregoing it will be seen that this invention is one well adapted to attain all of the ends and objects hereinabove set forth, together with other advantages which are obvious and which are inherent to the product and process.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:
1. A packing ring of molded construction comprising, a load bearing body having resilient sealing means including a flexible sealing lip of an elastomeric material molded about at least one of its radially inner and radially outer surfaces, said load bearing body comprising an inner core of a fibrous material impregnated with a thermosetting material, said thermosetting material being of a flowable nature while being molded and cured during manufacture of the ring but of a rigid, substantially incompressible nature after being molded and cured, and an outer flexible sheath of a material substantially impervious to the thermosetting material having parts confiningly enclosing the outer surfaces of said inner core for preventing the thermosetting material contained therein from flowing into said flexible sealing lips during the molding and curing operations, said inner core and its outer confining sheath being sufficiently flexible before being molded and cured to permit them to be shaped into a load bearing body of desired annular configuration for molding with said sealing means.

2. A packing ring according to claim 1 further characterized in that said inner core is provided by a plurality of tightly spun threads arranged in groups and tightly braided together in a square braid configuration, said threads being individually impregnated with said thermosetting material prior to being braided, and said outer sheath is provided by a woven fabric having parts tightly wrapped about and confiningly enclosing the outer surfaces of said inner core, said woven fabric being impregnated with a resilient sealing material and being supplied in an amount over and above that required to confiningly enclose the outer surfaces of the core sufficiently to provide at least one of said flexible sealing lips.

3. A packing ring according to claim 2 further characterized in that said woven fabric is supplied in an amount over and above that required to confiningly enclose the outer surfaces of said core sufficiently to provide both of said flexible sealing lips.

4. A process for making a packing ring comprising, preparing a core stock containing a thermosetting resin, said core stock being of a relatively flexible nature prior to being molded and cured but of a rigid, substantially incompressible nature after being molded and cured; tightly encasing said core stock in a confining sheath; shaping said encased core stock into a load bearing body of desired configuration for molding with pressure actuated seal means positioned along at least one of the radially inner and radially outer surfaces of said body; and molding said load bearing body and seal means together to provide an integral, substantially uncrushable packing ring of predetermined size and shape.

5. A process for making a packing ring comprising, individualy impregnating a plurality of threads with an uncured thermosetting resin; tightly braiding said resin impregnated threads together to form a flexible core stock of desired size and shape; tightly encasing said core stock in a confining sheath; shaping said encased core stock into a load bearing body of desired configuration for molding with resilient sealing material positioned along each of the radially inner and radially outer surfaces of the body; and molding said load bearing body and said resilient sealing material together to cure said thermosetting resin and form flexible sealing lips from the resilient sealing material.

6. A process for making a packing ring comprising, individually impregnating a plurality of relatively small, tightly spun threads with an uncured thermosetting resin, said thermosetting resin being of an extrudable nature when molded and cured during manufacture of the ring but of a rigid, substantially incompressible nature after being molded and cured; tightly braiding groups of said resin impregnated threads together in a square braid configuration to provide a flexible core stock of desired size and shape; confiningly sheathing said core stock against extrusion during molding and curing operations by tightly wrapping same with a woven fabric impregnated with a material different from said thermosetting resin; shaping said encased core stock into a load bearing body of desired configuration for molding positioning resilient sealing material positioned along each of the radially inner and radially outer surfaces of the body; and molding said load bearing body and resilient sealing material at a pressure and temperature sufficient to cure the thermosetting resin and to form flexible sealing lips from the resilient sealing material.

7. A process according to claim 6 further characterized in that said confining sheath is provided by a woven fabric impregnated with a resilient material and having parts tightly wrapped about and confiningly enclosing the outer surfaces of said braided core, said impregnated fabric being supplied in an amount over and above that required to enclose the outer surfaces of said core sufficiently to provide at least one of said flexible sealing lips.

8. A process for making a packing ring of the type having a relatively hard, load bearing body and flexible sealing lips molded about each of its radially inner and radialy outer surfaces comprising, individually impregnating to saturation a plurality of relatively small, tightly spun threads with a solution of an uncured thermosetting resin, removing the solvent from said resin impregnated threads; tightly braiding groups of said resin impregnated threads together in a square braid configuration to provide a flexible core stock of desired size and shape; compacting said braided core stock; encasing said compacted core stock in a confining sheath by tightly wrapping said core in woven fabric impregnated with a resilient sealing material supplying, said impregnated fabric in an amount over and above the amount required to cover the surfaces of the core stock sufficiently to provide said flexible sealing lips; further compacting said encased core stock; preforming said further compacted core stock into an annular body of desired configuration; and molding said preformed annular body at a pressure and temperature sufficient to cure said thermosetting resin and form flexible sealing lips from the excess impregnated fabric.

References Cited in the file of this patent

UNITED STATES PATENTS

| | | |
|---|---|---|
| 864,996 | Sackett | Sept. 3, 1907 |
| 1,455,682 | Trumbull | May 15, 1923 |
| 1,466,086 | Christenson | Aug. 28, 1923 |
| 1,706,031 | Lamb et al. | Mar. 19, 1929 |
| 2,370,913 | Procter | Mar. 6, 1945 |
| 2,684,262 | Neeson | July 20, 1954 |
| 2,686,092 | Neeson | Aug. 10, 1954 |
| 2,827,319 | Pearce | Mar. 18, 1958 |
| 2,859,061 | Reid | Nov. 4, 1958 |